United States Patent
Nguyen et al.

(10) Patent No.: US 7,587,191 B2
(45) Date of Patent: Sep. 8, 2009

(54) HIGH-QUALITY DETECTION BASED ON SEQUENTIAL INTERFERENCE CANCELLATION TECHNIQUES

(75) Inventors: Minh A. Nguyen, Fairfax, VA (US); Amir I. Zaghloul, Bethesda, MD (US)

(73) Assignee: The MITRE Corporation, McLean, VA (US)

( * ) Notice: Subject to any disclaimer, the term of this patent is extended or adjusted under 35 U.S.C. 154(b) by 579 days.

(21) Appl. No.: 11/387,955

(22) Filed: Mar. 24, 2006

(65) Prior Publication Data

US 2006/0217080 A1    Sep. 28, 2006

Related U.S. Application Data

(60) Provisional application No. 60/665,089, filed on Mar. 25, 2005.

(51) Int. Cl.
*H04B 1/16* (2006.01)
(52) U.S. Cl. ....................... 455/296; 375/349
(58) Field of Classification Search .............. 455/63.1, 455/226.1, 295, 296, 302–305; 375/299, 375/346, 347, 349; 370/208, 210
See application file for complete search history.

(56) References Cited

U.S. PATENT DOCUMENTS

2002/0109631 A1 * 8/2002 Li et al. ............... 455/296
2002/0191535 A1 * 12/2002 Sugiyama et al. ......... 370/208
2004/0100897 A1   5/2004 Shattil

FOREIGN PATENT DOCUMENTS

EP    1 300 999 A1    4/2003

* cited by examiner

*Primary Examiner*—Thanh C Le
(74) *Attorney, Agent, or Firm*—Sterne Kessler Goldstein & Fox, P.L.L.C.

(57) ABSTRACT

The present invention relates to a system and method for successive interference cancellation in a multi-user wireless communication system. In one aspect of the invention, a method of decoding signals from a plurality of superimposed signals is provided. In an embodiment, the plurality of superimposed signals are ranked in order of signal strength. The strongest signal is then decoded and a signal estimate thereof generated and subtracted from the plurality of superposition signals. The method repeats iteratively, decoding and canceling the strongest signal, until all signals are decoded. In another aspect of the invention, a system for decoding signals from a plurality of superimposed signals is provided. In an embodiment, the system is a wireless multi-user receiver.

14 Claims, 6 Drawing Sheets

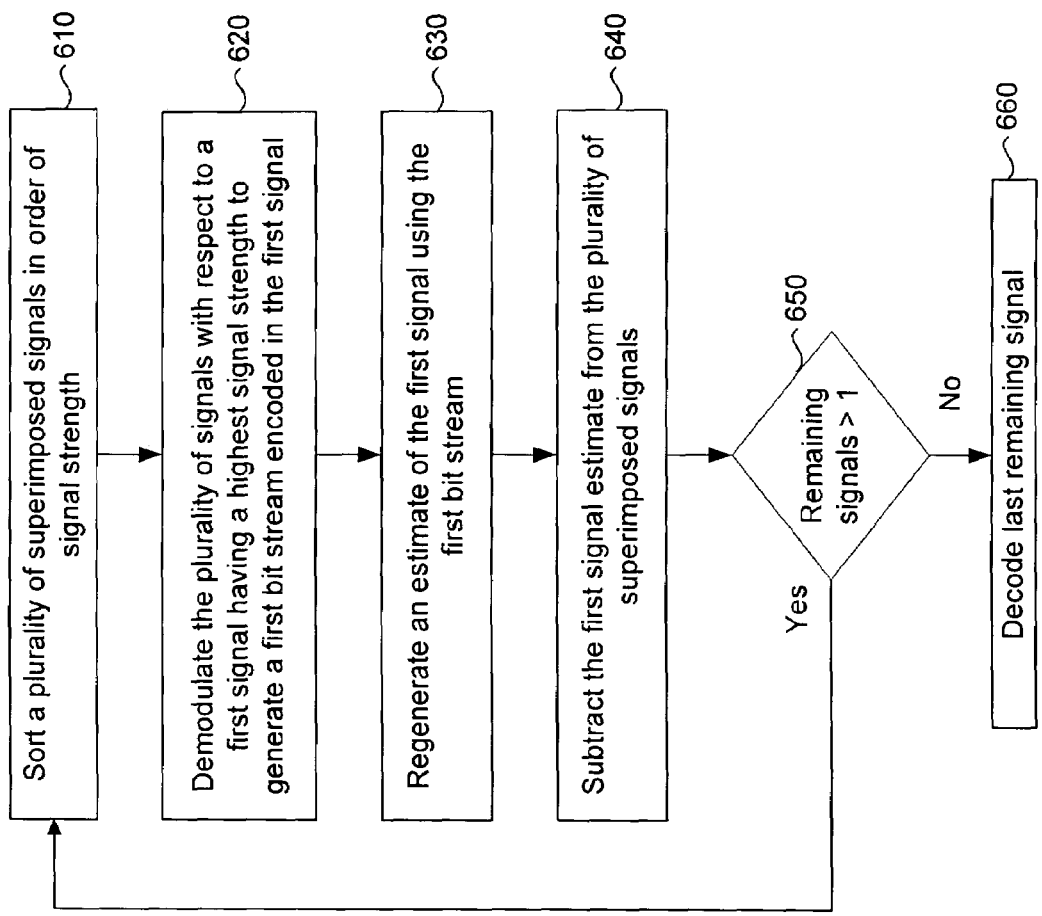

HIGH-QUALITY DETECTION BASED ON SEQUENTIAL INTERFERENCE CANCELLATION TECHNIQUES

FIELD OF THE INVENTION

The present invention relates generally to multi-user detection for communication systems. More particularly, the invention relates to a successive interference cancellation multi-user detector for wireless communication systems.

BACKGROUND OF THE INVENTION

In a multiple access wireless communications network, a plurality of users/transmitters communicate simultaneously with a single receiver in a given wireless spectrum. Given the shared nature of the wireless spectrum, however, signals transmitted by different users may collide at the receiver causing a loss of transmitted information and of network resources. This problem is known as multiple access interference (MAI) and is a main factor that limits the capacity and performance of a multiple access network.

In some cases, to remedy the MAI problem, the available spectrum in a network is multiplexed in time and/or frequency among available users/transmitters in the network. Each user may then receive a dedicated access time and/or frequency multiplexed channel to communicate with the receiver. Signals transmitted by different users in the network are then said to be orthogonal (in time and/or frequency), and, as a result, cause no interference to each other.

While significantly reducing potential MAI in a network, time and/or frequency multiplexing, on the other hand, often result in a far from optimal usage of the capacity of a network. For example, in a time division multiple access (TDMA) system, unless each user always has information ready to transmit during its allocated time slot, time opportunities to communicate with the receiver will be wasted resulting in a degraded throughput performance of the system.

In recent years, spread-spectrum-based code division multiple access (CDMA) has taken a greater role in multiple access networks. By using a unique spreading code for each user, CDMA eliminates the need for orthogonality in time and/or frequency among signals in a network. Typically, the unique spreading codes ensure low signal cross-correlation over a wideband, and allow for CDMA signals to be successfully decoded at a receiver in the presence of permissible interference.

Nonetheless, a low signal cross-correlation, as required by CDMA, is very challenging to maintain in a wireless spectrum due to unpredictable channel conditions. In fact, the random time offsets between signals that occur in a wireless spectrum make it difficult to ensure that CDMA signals are completely orthogonal. This may result in reduction of network capacity and throughput. Furthermore, since CDMA signals are typically spread over a very wide bandwidth, possibly the entire network's spectrum, transmit power level considerations impose further limitations on the capacity of CDMA systems.

In the last few years, however, multi-user detection (MUD) has received considerable attention as an area of research holding the key to improving the capacity and to alleviating some technical requirements of CDMA systems. Many algorithms for performing multi-user detection have been put forth. These range from the high-complexity optimum detectors to many forms of sub-optimum lower complexity detectors.

While a good number of the current solutions have shown to be too complex for actual implementation, a common limitation of these solutions is that they rely on spread-spectrum modulation to keep the cross-correlation between signals low. Consequently, this limits the applicability of these techniques to spread spectrum systems such as CDMA.

What is needed therefore is a multi-user detection technique having low implementation complexity and that supports detection for highly correlated signals. In other words, a multi-user detector is needed for both spread spectrum and non-spread spectrum systems that enables multiple access communication in a code, time, or frequency-multiplexed system.

BRIEF SUMMARY OF THE INVENTION

The present invention relates to a system and method for successive interference cancellation in a multi-user wireless communication system.

In one aspect of the invention, a method of decoding signals from a plurality of superimposed signals is provided. In an embodiment, the plurality of superimposed signals are ranked in order of received signal strength. The strongest signal is then decoded and a signal estimate thereof generated and subtracted from the plurality of superimposed signals. The method repeats iteratively, decoding and canceling the strongest signal, until all signals are decoded.

In another aspect of the invention, a system for decoding signals from a plurality of superimposed signals is provided. In an embodiment, the system is a wireless multi-user receiver.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 6 is a flowchart that illustrates an iterative interference cancellation technique according to the present invention.

The present invention will be described with reference to the accompanying drawings. The drawing in which an element first appears is typically indicated by the leftmost digit(s) in the corresponding reference number.

DETAILED DESCRIPTION OF THE INVENTION

Typical Multiple Access Communication Model

Figure 1:
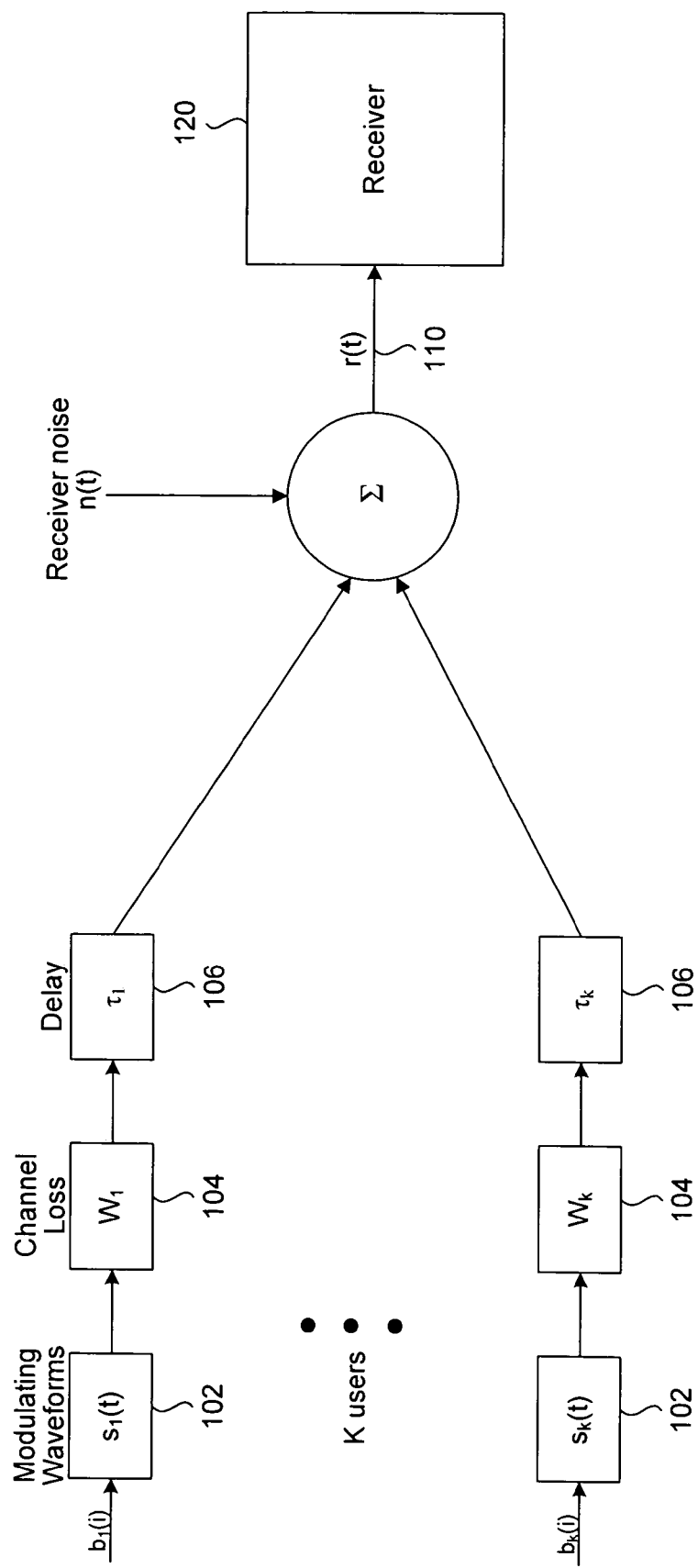
FIG. 1 is a block diagram that illustrates an example of a typical multiple access communication model.

FIG. 1 is a block diagram that illustrates an example of a typical multiple access communication model 100. In the example of FIG. 1, K users/transmitters are simultaneously accessing the same communication channel in order to communicate with a single receiver 120. The corresponding bit transmitted in bit period i, for a user k, is represented by $b_k(i)$. In an embodiment, $b_k(i)$ belongs to the set $\{+1, -1\}$.

Waveforms 102, represented by $s_1(t), \ldots, s_K(t)$, are used to modulate corresponding bits $b_1(i), \ldots, b_K(i)$. As can be understood by a person skilled in the relevant art, various types of modulating waveforms can be used at the transmitters to modulate bits $b_1(i), \ldots, b_K(i)$. For example, in a Frequency Division Multiple Access (FDMA) scheme, the modulating waveforms are the carrier frequencies with appropriate pulse shaping. In a Code Division Multiple Access (CDMA) scheme, however, the modulating waveforms correspond to the spreading codes assigned to each user.

Due to the lossy nature of the wireless channel, transmitted signals suffer attenuation as they propagate to the receiver. This is illustrated by the channel loss factors 104, represented as $w_1, \ldots, w_K$, in FIG. 1. Typically, channel loss factors $w_1, \ldots, w_K$ represent the relative received amplitude levels of the k users. Since users are typically at different physical distances from receiver 120 and may also employ different transmit power levels and experience different channel conditions, channel loss factors differ from one user to another.

In addition to attenuation, transmitted signals experience different delays before reaching the receiver. Delays 106, represented as $\tau_1, \ldots, \tau_K$, in FIG. 1 represent the relative transmission delays for the K users in communication model 100. Typically, transmission delays comprise one or more delays including, for example, a propagation delay. As a result, the transmitted signals are typically not received synchronously at the receiver.

Given the communication model 100 described above, the input at receiver 120, due to K users each transmitting a block of N bits, can then be written as:

$$s(t) = \sum_{i=1}^{N} \sum_{j=1}^{K} b_j(i) \sqrt{w_j} \, s_j(t - iT - \tau_j)$$

where T is the symbol period of the modulating waveforms $s_1(t), \ldots, s_K(t)$.

s(t) represents the noiseless input to receiver 120. Typically, however, one or more noise elements are added during reception, and, assuming an additive noise channel, the corresponding received signal 110 can be described as: r(t)=s(t)+n(t), where n(t) represents additive noise. It must be noted here that received signal r(t), as described above, represents a baseband received signal. Therefore, as can be understood by a person skilled in the relevant art, one or more steps of baseband down-conversion may have been omitted for the ease of illustration in FIG. 1.

A Multi-User Receiver

Figure 2:
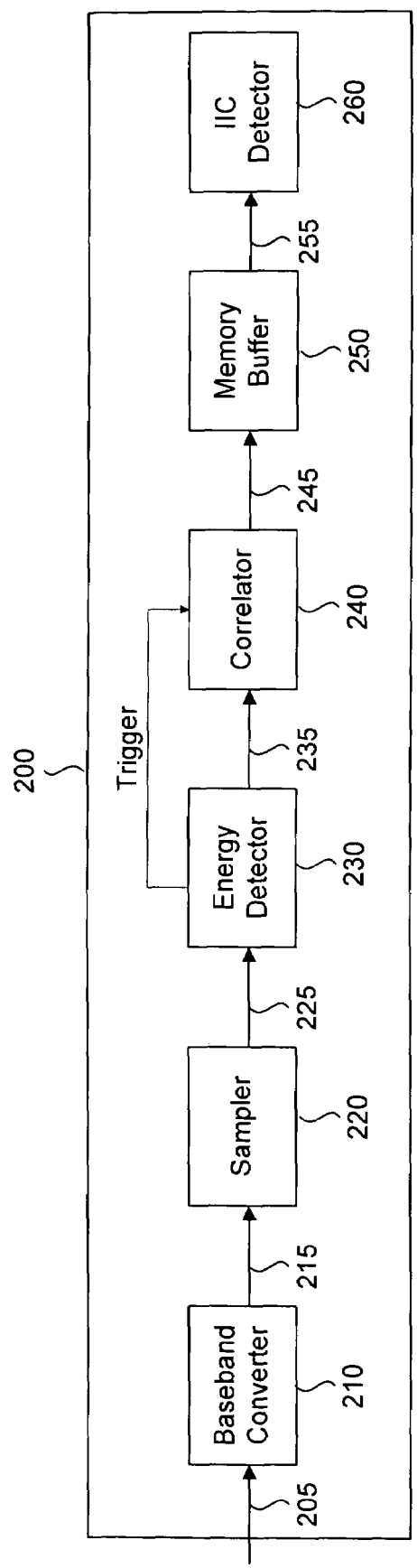
FIG. 2 is a block diagram that illustrates a multi-user receiver chain according to an embodiment of the present invention.

FIG. 2 is a block diagram that illustrates a multi-user receiver path 200 according to an embodiment of the present invention. Receiver path 200 includes a baseband converter 210, a sampler 220, an energy detector 230, a correlator 240, a memory buffer 250, and an IIC detector 260. Operation of the elements of receiver path 200 in the reception of a signal of interest will now be described with reference to FIG. 2.

Baseband converter 210 receives a bandpass signal 205 from a wireless antenna (not shown in FIG. 2). Typically, before reaching baseband converter 210, signal 205 undergoes a number of steps including bandpass filtering and amplification. Bandpass filtering allows the receiver to only pass content of the intercepted signal located within a desired range of frequencies. Amplifying steps are typically also needed as the bandpass filtered signal is often too weak for frequency down-conversion.

Baseband converter 210 converts bandpass signal 205 to a baseband signal 215. As can be understood by a person skilled in the relevant art, various down-conversion techniques can be used for baseband converter 210. In one embodiment, baseband converter 210 is a heterodyne baseband converter. In another embodiment, baseband converter 210 employs a direct-conversion scheme.

At the output of baseband converter 210, signal 215 is a baseband signal having frequency content located around the frequency of zero Hertz. Sampler 220 samples signal 215 according to a sampling rate to generate a sampled signal 225. Typically, the sampling rate is selected to be high enough for a distortion-less reconstruction of signal 215. In an embodiment, sampler 220 over-samples signal 215 at 6 times the information bit rate. As can be understood by a person skilled in the relevant art, sampler 220 may employ any of a number of well known sampling techniques. For example, sampler 220 uses a switched sampling or a zero-order-hold sampling technique.

Following sampling, a sampled signal 225 is fed into energy detector 230. Energy detector 230 typically includes a number of circuits designed to sense energy increases or decreases in received signal 225. In an embodiment, energy detector 230 continuously senses for any energy increase or decrease in received signal 225 according to the information bit rate of received signal 225. Furthermore, energy detector 230 triggers correlator 240 upon detecting an energy increase in signal 225 that may indicate the beginning of data reception. At the output of energy detector 230, signal 235 is unchanged relative to signal 225.

The function of correlator 240 is to detect the beginning of information data frames in a received signal. In an embodiment, a synchronization/training bit sequence, also known at the receiver, is attached at the beginning of every transmitted message. Correlator 240 is then designed such that its correlation output is at a maximum when the transmitted training sequence is received and is correctly aligned with a known synchronization/training bit sequence at the receiver. Accordingly, correlator 240, after locking into the training sequence, determines the beginning of information data frames in a received signal. In a multiple access model, correlator 240 detects the beginning of information data frames contained in a superposition of received signals.

At the output of correlator 240, a signal 245 is a superposition of information data frames. Referring to FIG. 2, signal 245 is buffered in its entirety into memory buffer 250. Memory buffer 250 then outputs periodically according to the information bit rate the content 255 of its buffer to the IIC detector 260. In an embodiment, the content of memory buffer 250 is entirely outputted to IIC detector 260 before any new content is buffered in.

IIC detector 260 receives a superposition of information data frames from memory buffer 250, and, for each information data frame contained in the superposition, detects a corresponding data bit stream. A description of the operation of IIC detector 260 follows.

An Iterative Interference Cancellation Detector

Figure 3:
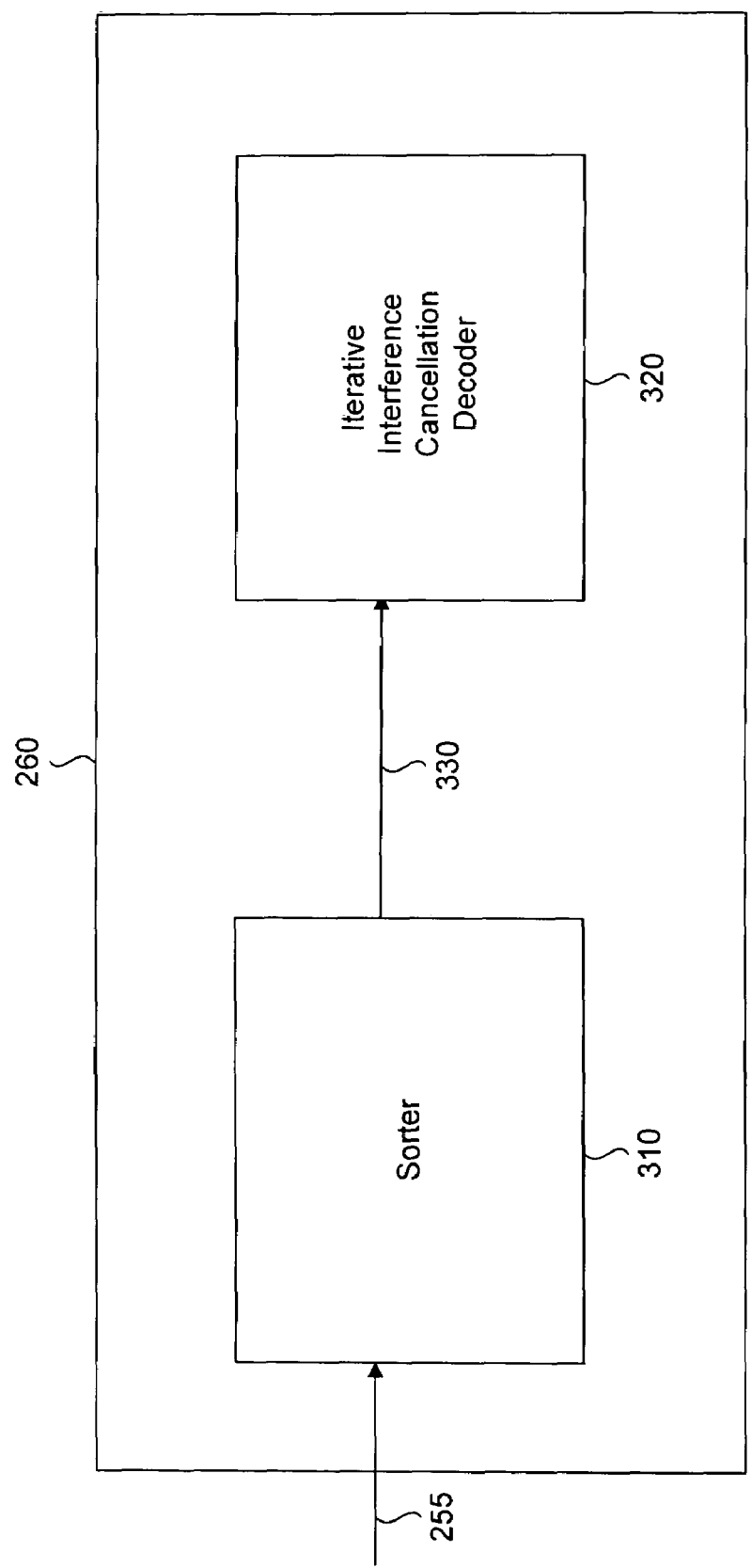
FIG. 3 is a block diagram that illustrates a multi-user detector according to an embodiment of the present invention.

FIG. 3 is a high-level block diagram of the multi-user IIC detector 260 of FIG. 2 according to an embodiment of the present invention. As shown in FIG. 3, IIC detector 260 includes a sorter circuit 310 and an IIC decoder 320. The operation of IIC detector 260 will now be described with reference to FIG. 3.

At the input of IIC detector 260, signal 255 is a superposition of information data frames. The beginning and the signal level of each of the information data frames contained in the superposition of information data frames is known at IIC detector 260.

As a preliminary step to iterative interference cancellation in IIC decoder 320, sorter circuit 310 ranks based on the received signal strength the information data frames contained in signal 255. Accordingly, the strongest signal is ranked first and the weakest signal is ranked last. The output 330 of sorter circuit 310 is then provided to IIC decoder 320.

In an embodiment of the present invention, IIC decoder 320 works by successively decoding the strongest signal in a superposition of signals, regenerating the signal, and subtracting it off from the superposition of signals, then repeating this technique for the next strongest signal until every signal is successfully decoded.

The signals are decoded in decreasing order of signal strength because: 1) it is easiest to achieve acquisition and demodulation on the strongest signal: the strongest signal has the best chance for correct decoding, and, as a result, the best chance for the most reliable cancellation; and (2) the cancellation of the strongest signal results in the maximum interference reduction for the remaining signals.

Figure 4:
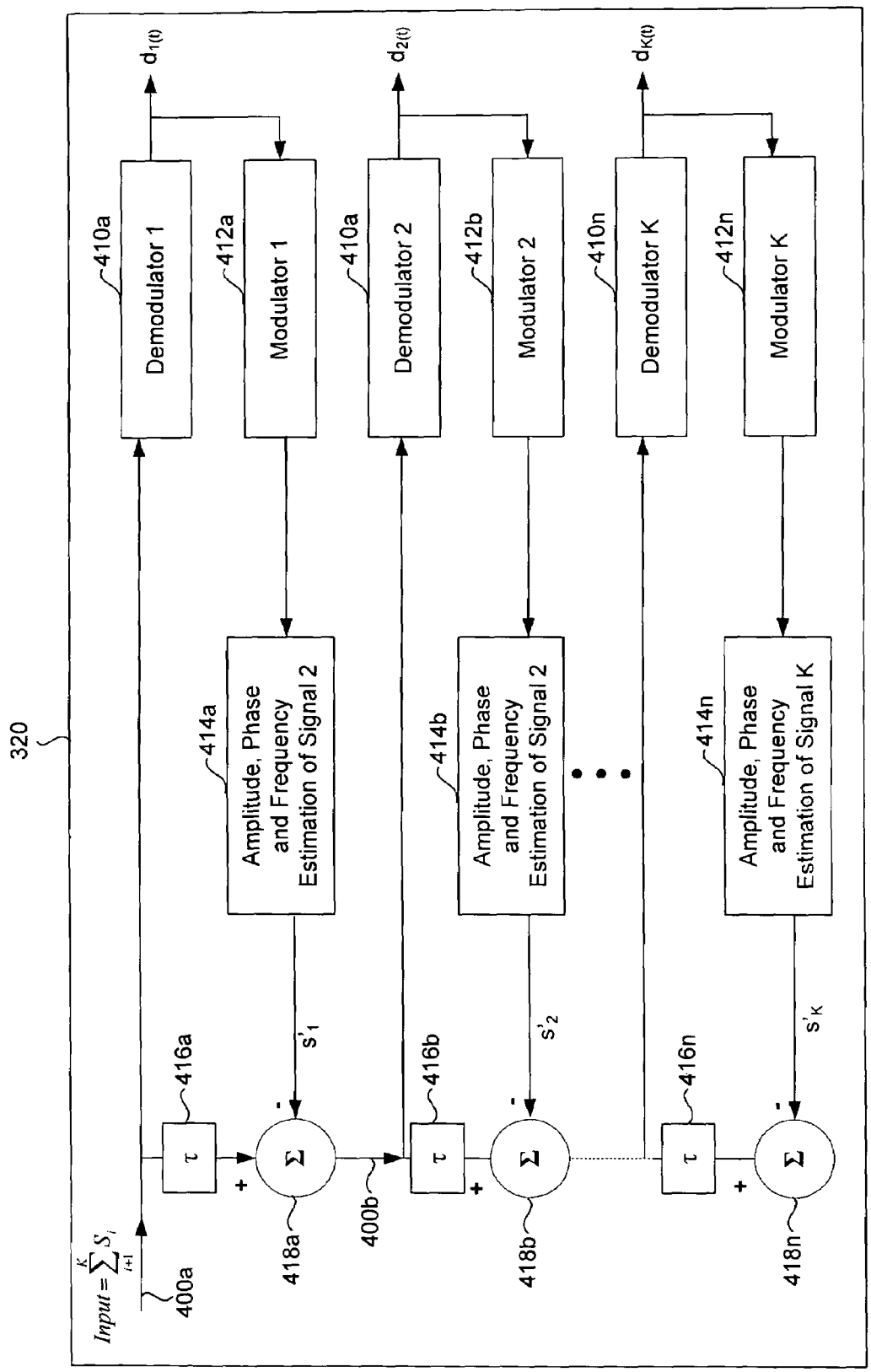
FIG. 4 is a block diagram that illustrates an iterative interference cancellation decoder according to an embodiment of the present invention.

FIG. 4 is a block diagram that illustrates the iterative interference cancellation IIC decoder 320 of FIG. 3 according to an embodiment of the present invention. The operation of IIC decoder 320 will now be described with reference to FIG. 4.

As mentioned above, IIC decoder 320 takes a serial approach to canceling interference. As a result, each stage i of IIC decoder 320 is concerned with the decoding and cancellation of the i-th strongest signal in the superposition of signals 400a of FIG. 4.

In an embodiment of the present invention, stage 1 of IIC decoder 320 includes a demodulator 410a, a modulator 412a, an estimation block 414a, a time delay device 416a, and a summer circuit 418a. Subsequent stages 2, . . . , K of IIC decoder 320 include the same elements as stage 1. The operation of a stage of IIC decoder 320 will now be described with respect to the elements of stage 1.

In the exemplary embodiment of FIG. 4, a superposition of K signals 400a is received at the input of stage 1 of IIC decoder 320. Demodulator 410a is configured to demodulate the strongest signal $s_1$ contained in the superposition of signals 400a. In an embodiment, demodulator 410a includes a correlation-type demodulator and a bit decoder. In the example of FIG. 4, demodulator 410a decodes signal $s_1$ to generate a first bit stream $d_1(t)$. Bit stream $d_1(t)$ matches exactly the bit stream encoded in transmitted signal $s_1$ if no decoding errors are made. Typically, decoding errors can be attributed to high MAI levels.

After decoding $s_1$, it remains to subtract it off from the superposition of signals 400a. Using the first bit stream $d_1(t)$, an estimate of signal $s_1$ is reconstructed. In a first step, the first bit stream $d_1(t)$ is re-modulated using modulator 412a. In an embodiment, modulator 412a applies the exact same bit modulation and encoding techniques as used by the transmitter of signal $s_1$.

At the output of modulator 412a, the re-modulated version of signal $s_1$ corresponds to a pre-transmission version of signal $s_1$. In other words, the re-modulated version at the output of modulator 412a does not take into account the channel effects on transmitted signal $s_1$. To account for channel effects, the re-modulated signal is acted upon by the estimation block 414a. Estimation block 414a estimates channel conditions and applies appropriate corrections to the amplitude, phase, and frequency of the re-modulated signal to generate the first signal estimate $s'_1$. In other words, estimation block 414a attempts to minimize the difference between the first signal estimate $s'_1$ and the actual received signal $s_1$.

Still referring to FIG. 4, after the first signal estimate $s'_1$ is generated, it is subtracted from the superposition of signals 400a using summer circuit 418a. Since typically a time delay is incurred to decode the first signal $s_1$ and reconstruct its estimate, a time delay device 416a is used to delay signal 400a, thereby guaranteeing that the inputs to summer circuit 418a are synchronized in time. The output of summer circuit 418a comprises a superposition of the remaining signals after the subtraction of the strongest signal, and constitutes the input to the second stage of the IIC decoder 320. The process described above repeats in the multi-stage structure of IIC decoder 320 until all K signals are decoded.

Figure 5:
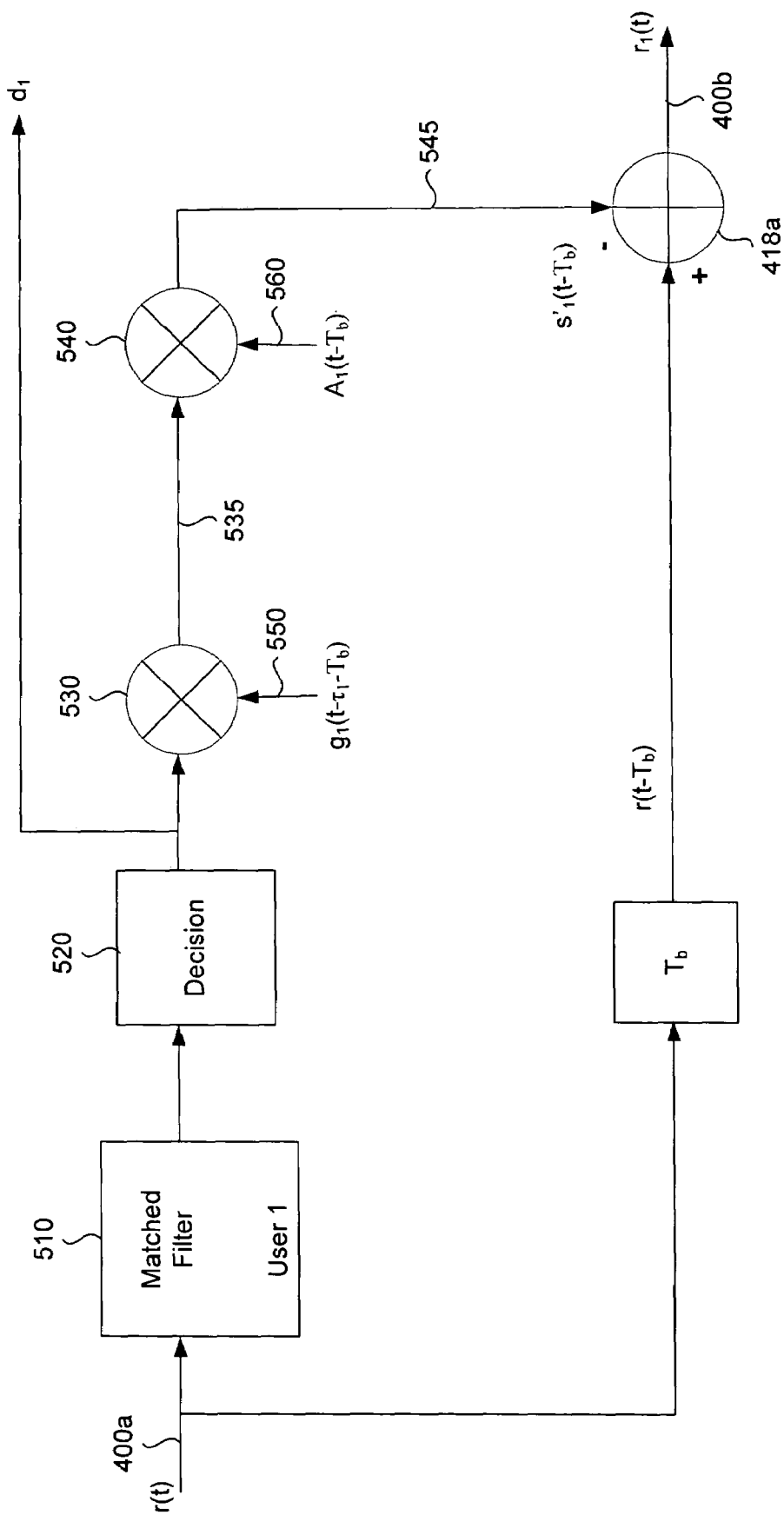
FIG. 5 is a block diagram that illustrates a first stage of the iterative cancellation decoder of FIG. 4.

FIG. 5 is a block diagram that illustrates another embodiment of the first stage of the IIC decoder 320 of FIG. 4. In the embodiment of FIG. 5, the superposition of signals 400a is first fed into a matched filter 510 to demodulate the strongest signal $s_1$. In an embodiment, matched filter 510 has an impulse response matched to the modulating waveform of signal $s_1$, thereby maximizing the signal-to-interference ratio of signal $s_1$ at the output.

Decision block 520 makes a hard decision on $s_1$ using the output of matched filter 510. In an embodiment, decision block 520 decodes signal $s_1$ to generate a bit stream $d_1$. Bit stream $d_1$ corresponds to the information content encoded in signal $s_1$.

Similar to the embodiment of FIG. 4, signal $s_1$ is then reconstructed using bit stream $d_1$ before being subtracted from a time delayed version of signal 400a. In the embodiment of FIG. 5, mixer circuit 530 re-modulates bit stream $d_1$ by multiplying it with a modulating waveform 550. In an embodiment, modulating waveform 550 is a replica of the modulating waveform used by the transmitter of signal $s_1$.

In another embodiment, phase offset compensation is also incorporated into the re-modulating step. In the embodiment of FIG. 5, this is reflected by the relative transmission delay term $\tau_1$ in the modulating waveform expression.

Following re-modulation of bit stream $d_1$, amplitude compensation is applied to the re-modulated signal 535 based on estimation of channel conditions. In the embodiment of FIG. 5, mixer 540 multiplies re-modulated signal 535 with an appropriate amplitude modulating waveform 560. As can be understood by a person skilled in the relevant art, amplitude modulating waveform 560 applies appropriate amplification/attenuation factors to the various frequency components of re-modulated signal 535.

The output of mixer circuit 540, signal 545, represents an estimate of signal $s_1$. Stage 1 of the IIC decoder is completed by subtracting off signal 545 from a time delayed version of signal 400a as discussed above using time delay device 416a and summer circuit 418a. The output 410b of stage 1 represents the input to stage 2 of the decoder.

A Multi-User Detection Method

FIG. 6 is a flowchart that illustrates an iterative interference cancellation technique for decoding a plurality of superimposed signals according to the present invention. The process of FIG. 6 includes steps 610, 620, 630, 640, 650, and 660.

In step 610, the plurality of superimposed signals are sorted in order of signal strength. In an embodiment of the present invention, an energy detector circuit is used to detect the signal levels of the plurality of superimposed signals. A sorter circuit then ranks the plurality of superimposed signals in decreasing order of signal strength.

In step 620, the plurality of superimposed signals are demodulated with respect to a first signal having the highest signal strength among the plurality of superimposed signals. As a result of step 620, the first signal is decoded and a corresponding first bit stream is generated.

In step 630, using the first bit stream generated in step 620, an estimate of the first signal is regenerated. In an embodiment, the first bit stream is re-modulated using a replica of the modulating waveform used by the transmitter of the first signal. Further, amplitude, frequency, and phase corrections are applied to the re-modulated signal in order to closely estimate the first signal.

In step 640, the first signal estimate is subtracted from the plurality of superimposed signals. At the end of step 640, a superposition of one or more remaining signals is generated.

At step 650, the number of remaining signals in the superposition is evaluated. If the number of remaining signals is larger than 1, the process returns to step 610, and steps 610-640 are repeated with respect to the strongest signal in the superposition of remaining signals. Otherwise, only the weakest signal in the plurality of superimposed signals remains, and the process moves to step 660 where the last remaining signal is decoded. In step 660, the last remaining signal is decoded with no MAI due to other signals.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of decoding signals from a plurality of superimposed signals, comprising:
   (a) processing the plurality of superimposed signals to generate a first bit stream;
   (b) processing the first bit stream to generate a first signal estimate of a first signal of the plurality of superimposed signals; and
   (c) subtracting the first signal estimate from the plurality of superimposed signals to generate a superposition of one or more remaining signals,
   wherein step (a) further comprises:
      (i) sorting the plurality of superimposed signals in order or signal strength;
      (ii) selecting a signal having a highest signal strength from which to generate the first bit stream; and
      (iii) demodulating the plurality of superimposed signals with respect to the signal having the highest signal strength, thereby decoding the first bit stream; and
   wherein step (b) further comprises:
      (i) modulating the first bit stream to generate a first intermediate signal; and
      (ii) processing the first intermediate signal to generate the first signal estimate; and
   wherein step (b)(ii) further comprises estimating amplitude, phase, and frequency parameters of the first signal and compensating for the parameters to generate the first signal estimate.

2. The method of claim 1, further comprising:
   (d) repeating steps (a)-(c) until all of the remaining signals are decoded.

3. The method of claim 1, wherein the first signal estimate is substantially equivalent to the first signal when the estimates of the amplitude, phase and frequency parameters are substantially equal to actual parameters of the first signal.

4. The method of claim 1, wherein the plurality of superimposed signals overlap partially or entirely in the time domain.

5. The method of claim 1, wherein the plurality of superimposed signals overlap entirely in the frequency domain.

6. The method of claim 1, wherein the plurality of superimposed signals use a common bit encoding scheme, bit modulation scheme, and message format.

7. The method of claim 1, wherein the plurality of superimposed signals are pairwise non-orthogonal.

8. The method of claim 1, wherein the signals are non-spread spectrum signals.

9. The method of claim 1, wherein the signals are spread-spectrum signals.

10. The method of claim 1, further comprising:
    (d) receiving the plurality of superimposed signals in a wireless receiver.

11. A system for decoding signals from a plurality of superimposed signals, comprising:
    a first circuit configured to process the plurality of superimposed signals and generate a first bit stream;
    a second circuit, coupled to the first circuit, configured to process the first bit stream and generate a first signal estimate of a first signal of the plurality of superimposed signals; and
    a third circuit configured to subtract the first signal estimate from the plurality of superimposed signals and generate a superposition of one or more remaining signals;
    wherein the first circuit comprises:
       a sixth circuit configured to sort the plurality of superimposed signals in order of signal strength;
       a seventh circuit configured to select a signal having a highest signal strength from which to generate the first bit stream; and
       an eight circuit configured to demodulate the plurality of superimposed signals with respect to the signal having the highest signal strength; and
    wherein the second circuit comprises:
       a fourth circuit, coupled to the first circuit, configured to modulate the first bit stream and generate a first intermediary signal; and
       a fifth circuit, coupled to the fourth circuit, configured to process the first intermediary signal and generate the first signal estimate; and
       wherein the fifth circuit comprises circuitry configured to estimate amplitude, phase, and frequency parameters of the first signal and to compensate for the parameters to generate the first signal estimate.

12. The system of claim 11, wherein the fourth circuit comprises a modulator and an encoder.

13. The system of claim 11, wherein the first circuit comprises a demodulator and a decoder.

14. A wireless receiver, comprising:
   means for processing a plurality of superimposed signals to generate a first bit stream;
   means for processing the first bit stream to generate a first signal estimate of a first signal of the plurality of superimposed signals; and
   means for subtracting the first signal estimate from the plurality of superimposed signals to generate a superposition of one or more remaining signals;
   wherein said means for processing the plurality of superimposed signals comprises:
      means for sorting the plurality of superimposed signals in order of signal strength;
      means for selecting a signal having a highest signal strength from which to generate the first bit stream; and
      means for demodulating the plurality of superimposed signals with respect to the signal having the highest signal strength; and
   wherein said means for processing the first bit stream comprises:
      means for modulating the first bit stream to generate a first intermediate signal; and
      means for processing the first intermediate signal to generate the first signal estimate; and
   wherein said means for processing the first intermediate signal comprises means for estimating amplitude, phase, and frequency parameters of the first signal and means for compensating for the parameters to generate the first signal estimate.

* * * * *